US 11,745,364 B2

(12) United States Patent
Oikawa et al.

(10) Patent No.: US 11,745,364 B2
(45) Date of Patent: Sep. 5, 2023

(54) ROBOT AND FIRST ARM MEMBER

(71) Applicant: Fanuc Corporation, Yamanashi (JP)

(72) Inventors: Akihiro Oikawa, Yamanashi (JP); Shunsuke Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 5 days.

(21) Appl. No.: 16/594,299

(22) Filed: Oct. 7, 2019

(65) Prior Publication Data
US 2020/0122343 A1    Apr. 23, 2020

(30) Foreign Application Priority Data
Oct. 17, 2018  (JP) .............................. JP2018-195560

(51) Int. Cl.
    B25J 17/02     (2006.01)
(52) U.S. Cl.
    CPC .................................. B25J 17/025 (2013.01)
(58) Field of Classification Search
    CPC . B25J 17/025; B25J 18/00; B25J 9/009; B25J 9/0024; B25J 9/046; B25J 9/047; B25J 9/08; B25J 9/1617
    See application file for complete search history.

(56) References Cited

U.S. PATENT DOCUMENTS

| | | | | |
|---|---|---|---|---|
| 4,552,505 A | * | 11/1985 | Gorman ................. | H02K 37/00 318/568.1 |
| 4,636,138 A | * | 1/1987 | Gorman ................. | B25J 19/002 414/735 |
| 4,645,409 A | * | 2/1987 | Gorman ................... | B25J 9/126 901/29 |
| 4,671,732 A | * | 6/1987 | Gorman ................. | B25J 19/002 901/29 |

(Continued)

FOREIGN PATENT DOCUMENTS

| | | |
|---|---|---|
| CN | 104708618 A | 6/2015 |
| DE | 10245899 B4 | 1/2005 |

(Continued)

OTHER PUBLICATIONS

Sadamitsu, Daiki; Notice of Reasons for Refusal; Japanese Patent Application No. 2018-195560; dated Dec. 15, 2020; 5 pages.

(Continued)

Primary Examiner — Gregory Robert Weber
(74) Attorney, Agent, or Firm — Shackelford, Bowen, McKinley & Norton, LLP

(57) ABSTRACT

The robot includes a first arm member rotatable about a first axis line which extends in an up-and-down direction with respect to a base member, a second arm member supported by the first arm member so as to be swingable about a second axis line which extends in a horizontal direction, and a third arm member supported by a distal end side of the second arm member so as to be swingable about a third axis line (Continued)

which extends in a horizontal direction, and the first arm member is provided with a first attaching surface which is a surface substantially perpendicular to the second axis line, and to which the second arm member can be attached, and a second attaching surface which faces in a direction opposite from the first attaching surface, and to which the second arm member can be attached.

10 Claims, 13 Drawing Sheets

(56) References Cited

U.S. PATENT DOCUMENTS

| | | | | |
|---|---|---|---|---|
| 5,428,713 | A * | 6/1995 | Matsumaru | B25J 9/1615 700/262 |
| 6,568,869 | B1 * | 5/2003 | Murata | B62D 57/02 446/129 |
| 6,605,914 | B2 * | 8/2003 | Yim | A63H 33/042 901/23 |
| 6,892,465 | B2 * | 5/2005 | Raab | B25J 9/023 33/DIG. 1 |
| 7,013,750 | B1 * | 3/2006 | Kazami | B25J 9/08 901/29 |
| 9,120,229 | B2 * | 9/2015 | Roth | B25J 9/08 |
| 9,242,377 | B2 * | 1/2016 | Gomi | B25J 9/1638 |
| 10,456,905 | B2 * | 10/2019 | Shin | B25J 9/08 |
| 11,161,255 | B2 * | 11/2021 | Ayuzawa | B25J 9/102 |
| 2008/0056859 | A1 | 3/2008 | Inoue et al. | |
| 2012/0198955 | A1 * | 8/2012 | Hayashi | B25J 9/046 74/490.05 |
| 2014/0309776 | A1 | 10/2014 | Asada et al. | |
| 2015/0283709 | A1 | 10/2015 | Dalakian | |
| 2017/0100844 | A1 * | 4/2017 | Raak | B25J 9/08 |
| 2019/0099882 | A1 * | 4/2019 | Nakayama | B25J 9/042 |
| 2019/0366553 | A1 * | 12/2019 | Simkins | B25J 15/0061 |
| 2020/0061809 | A1 * | 2/2020 | Phillips | B25J 9/08 |
| 2020/0298422 | A1 * | 9/2020 | Ayuzawa | B25J 17/00 |

FOREIGN PATENT DOCUMENTS

| | | | |
|---|---|---|---|
| EP | 1892064 A1 | 2/2008 | |
| EP | 1777043 B1 | 7/2008 | |
| EP | 2113343 A2 | 11/2009 | |
| EP | 2364821 A1 | 9/2011 | |
| JP | S62-282886 A | 12/1987 | |
| JP | H03-202287 A | 9/1991 | |
| JP | 2006-026748 A | 2/2006 | |
| JP | 4267530 B | 5/2009 | |
| JP | 4326558 B | 9/2009 | |
| JP | 2014-205196 A | 10/2014 | |
| JP | 2017-035746 A | 2/2017 | |
| JP | 2017177276 A * | 10/2017 | B25J 9/0009 |

OTHER PUBLICATIONS

Industrial Property Cooperation Center; Search Report by Registered Search Organization; Japanese Patent Application No. 2018-195560; dated Nov. 13, 2020; 8 pages.

* cited by examiner

ROBOT AND FIRST ARM MEMBER

CROSS-REFERENCE TO RELATED APPLICATIONS

This application is based on and claims priority to Japanese Patent Application No. 2018-195560 filed on Oct. 17, 2018, the content of which is incorporated herein by reference in its entirety.

Technical Field

This invention relates to a robot and a first arm member.

Background Art

Conventionally, there is a known wrist mechanism of a robot whose arm member is configured by two parts, and a plurality of attaching surfaces are provided in the periphery of one of the two parts so that the two parts are connected by using any of the attaching surfaces, and whereby shape of the arm member can be changed. (See PTL 1, for example.)

Citation List

Patent Literature

{PTL 1}
Japanese Unexamined Patent Application, Publication No. 2006-26748

SUMMARY OF INVENTION

A robot according to a first aspect of the present invention includes a first arm member rotatable about a first axis line which extends in an up-and-down direction with respect to a base member; a second arm member supported by the first arm member and so as to be swingable about a second axis line which extends in a horizontal direction; and a third arm member which is supported by a distal end side of the second arm member so as to be swingable about a third axis line which extends in the horizontal direction, wherein, the first arm member is provided with a first attaching surface which is a surface substantially perpendicular to the second axis line, and to which the second arm member can be attached, and the first arm member is provided with a second attaching surface which faces in a direction opposite from the first attaching surface, and to which the second arm member can be attached.

A second aspect of the present invention is a first arm member used in a robot which includes: a first arm member which is rotatable about a first axis line which extends in an up-and-down direction with respect to a base; a second arm member which is supported by the first arm member so as to be swingable about the second axis line which extends in a horizontal direction; and a third arm member which is supported by the second arm member so as to be swingable about a third axis line which extends in the horizontal direction, the first arm member comprising: a first portion fixed to a reducer for the first arm member; and a second portion fixed to the first portion, wherein the second portion is provided with a first attaching surface which is a surface substantially perpendicular to the second axis line, and to which the second arm member can be attached, and the second portion is provided with a second attaching surface which faces in a direction opposite from the first attaching surface, and to which the second arm member can be attached.

BRIEF DESCRIPTION OF DRAWINGS

Description of Embodiments

Figure 1:
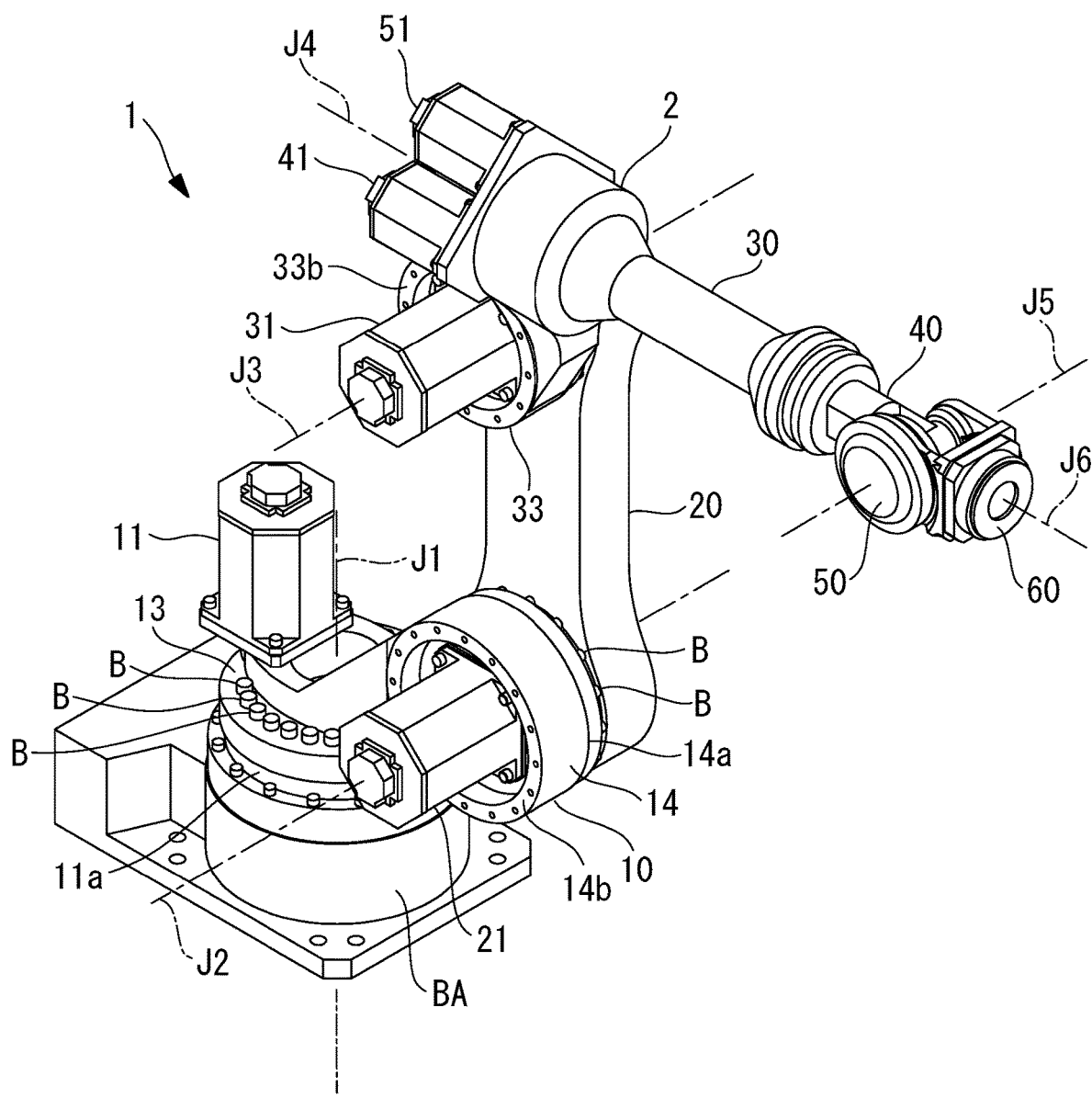
Figure 2:
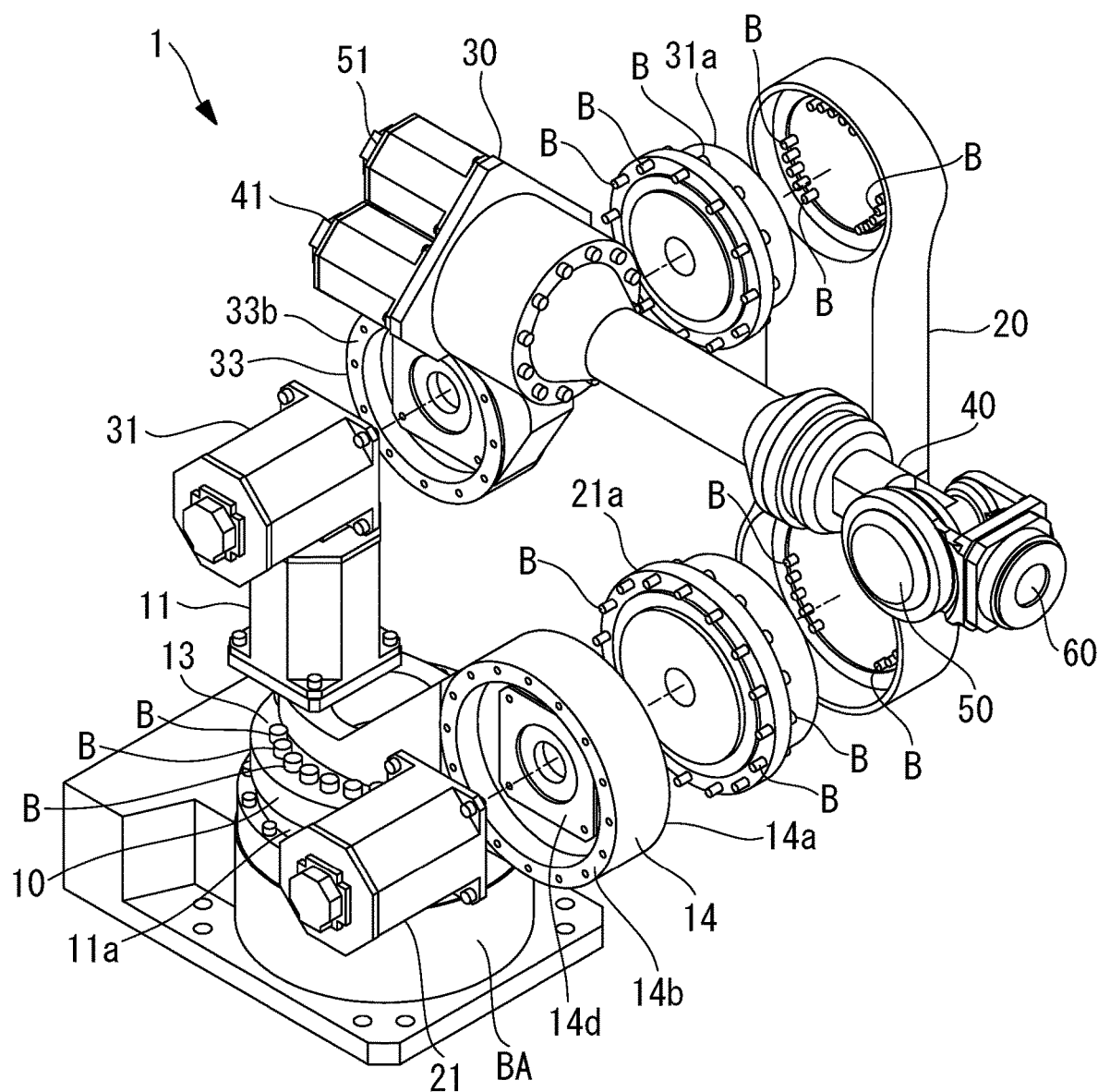
Figure 3:
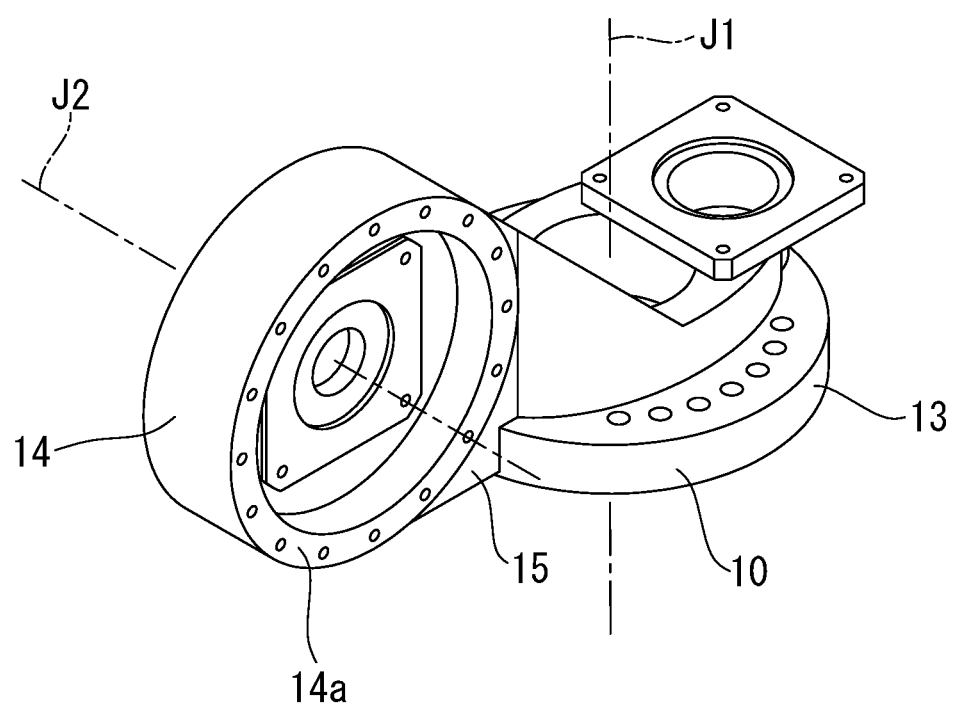
Figure 4:
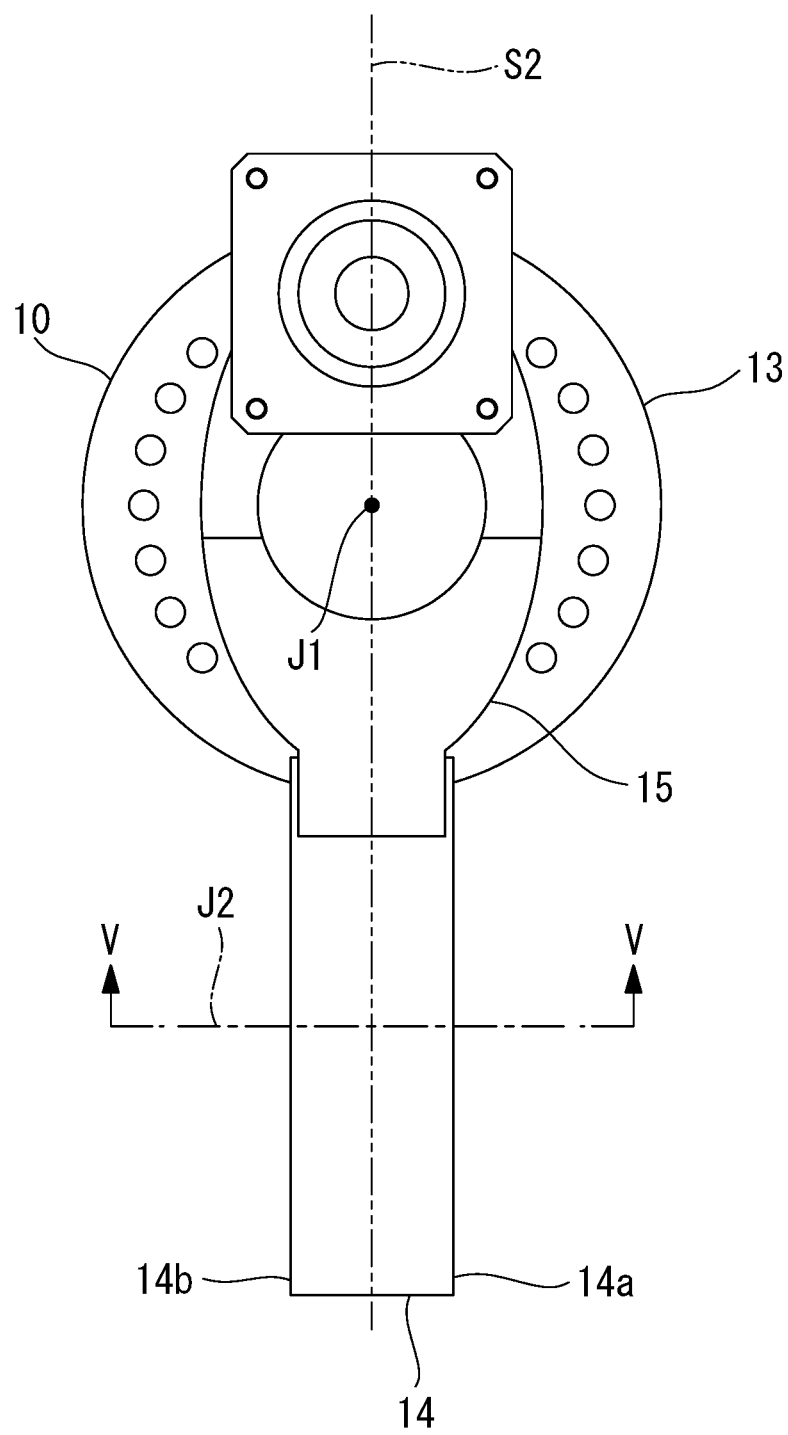
Figure 5:
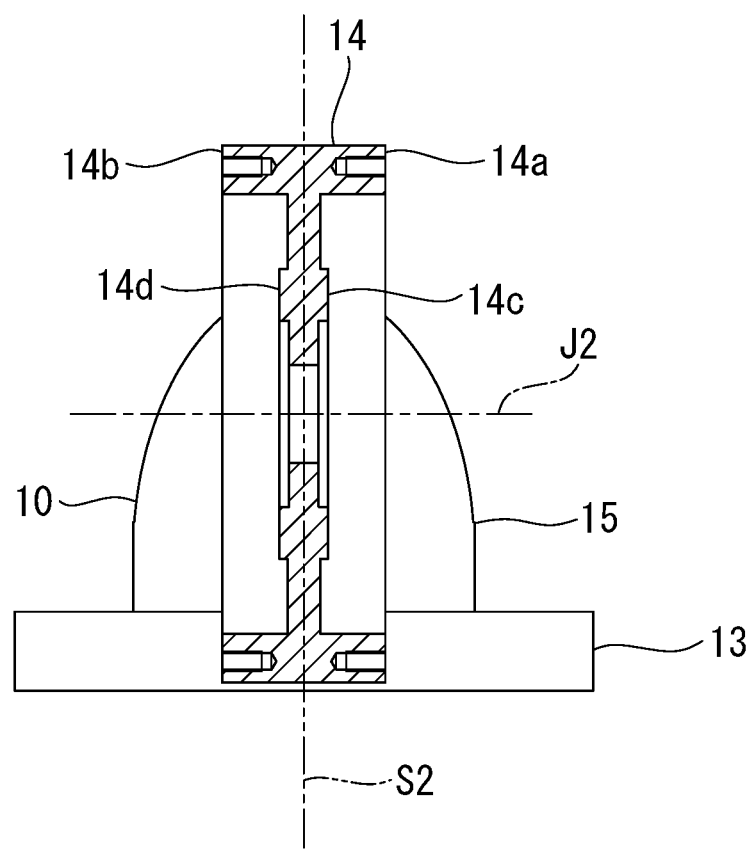
Figure 6:
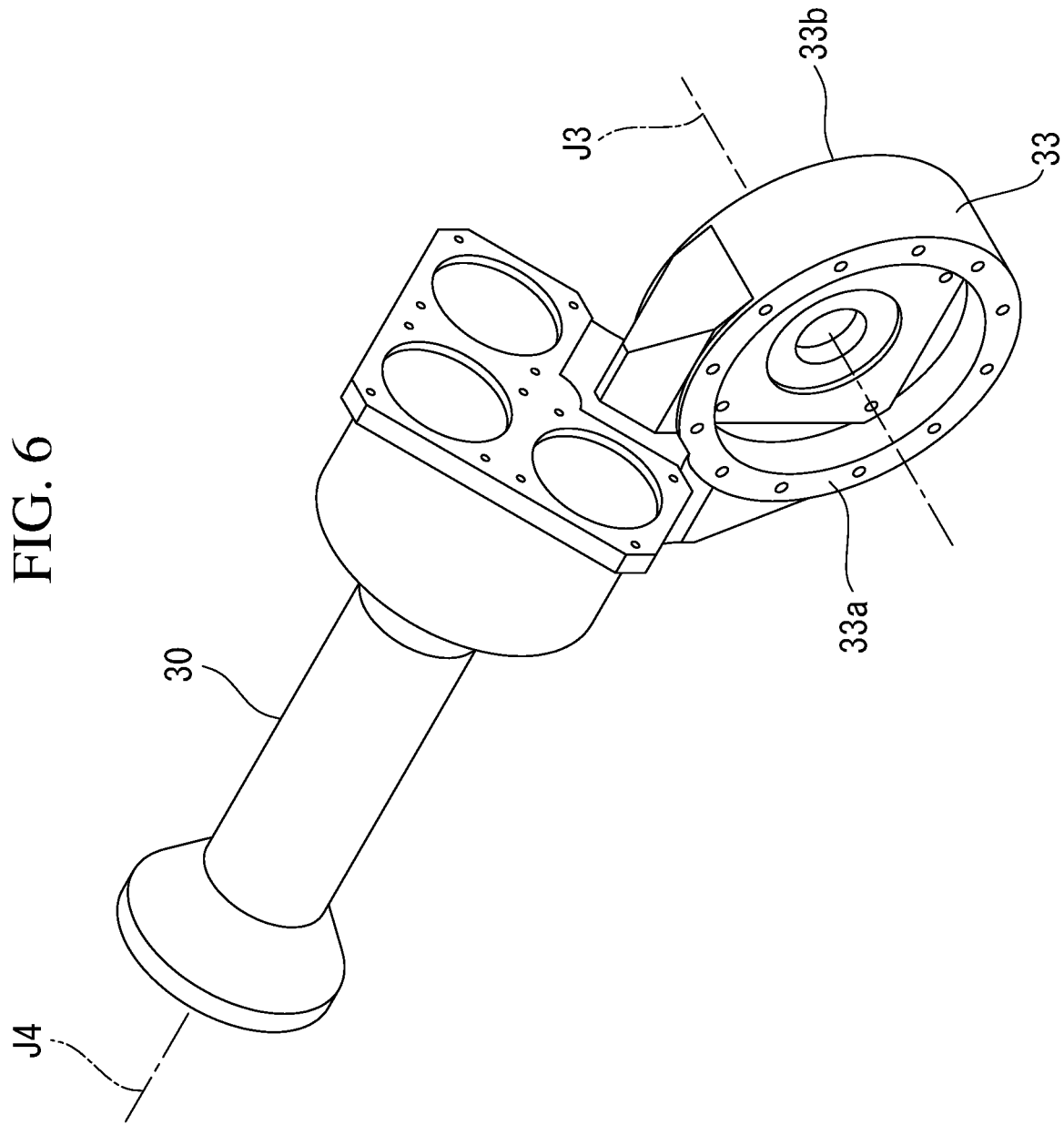
Figure 7:
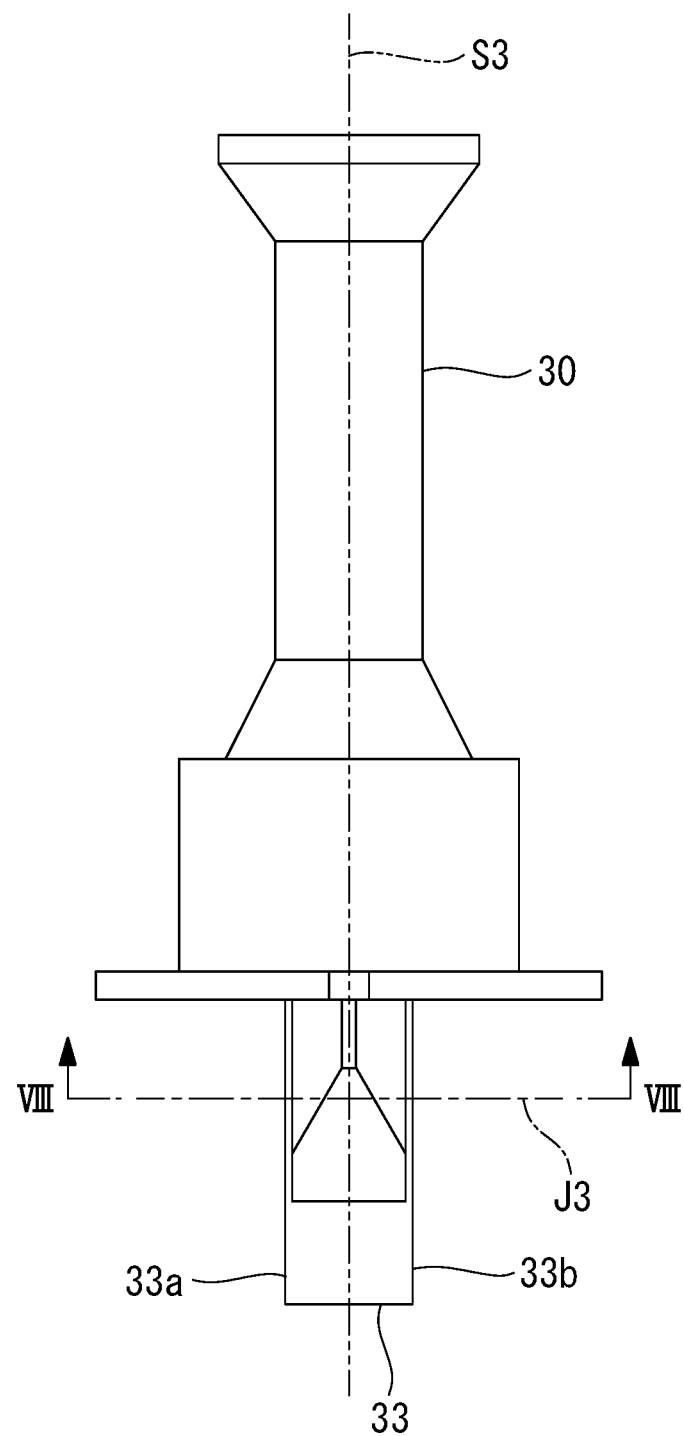
Figure 8:
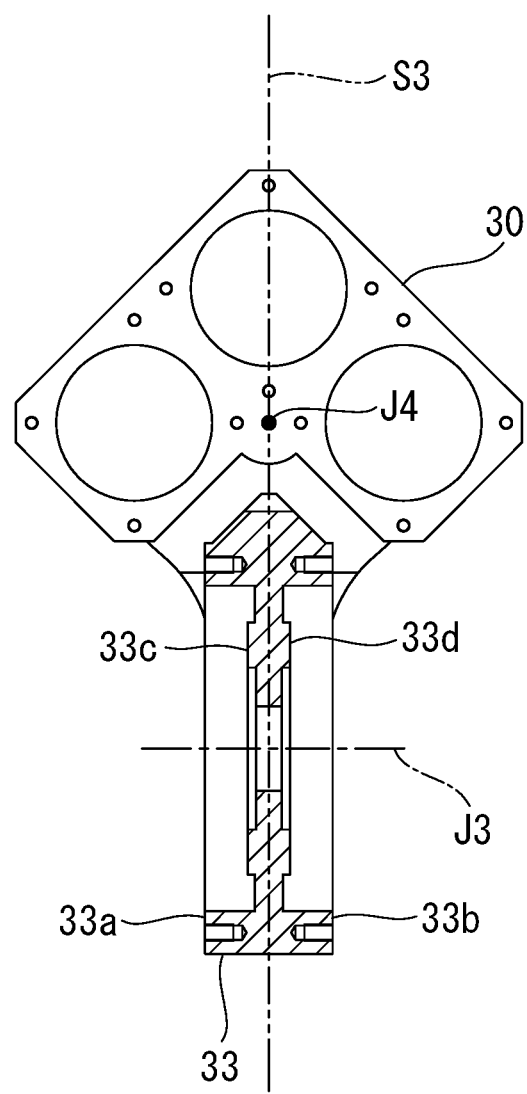
Figure 9:
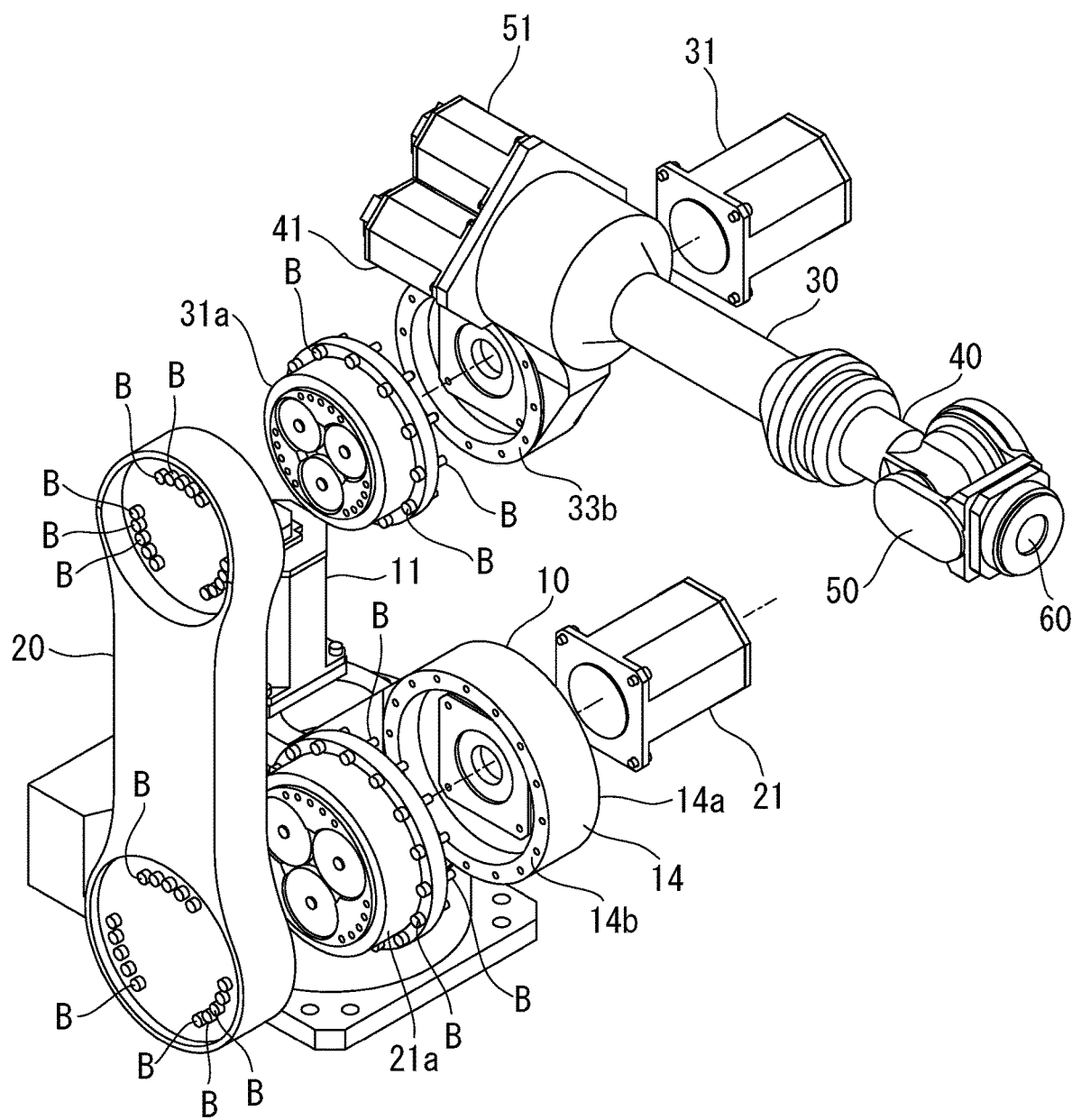
Figure 10:
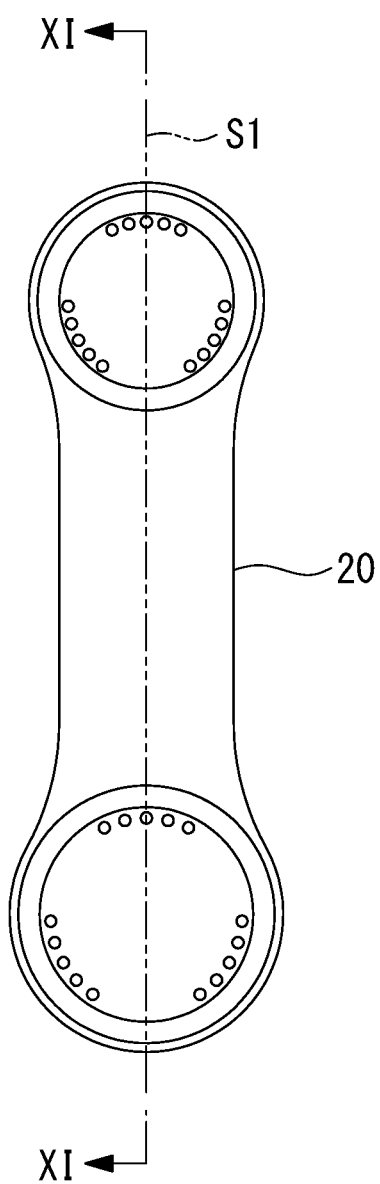
Figure 11:
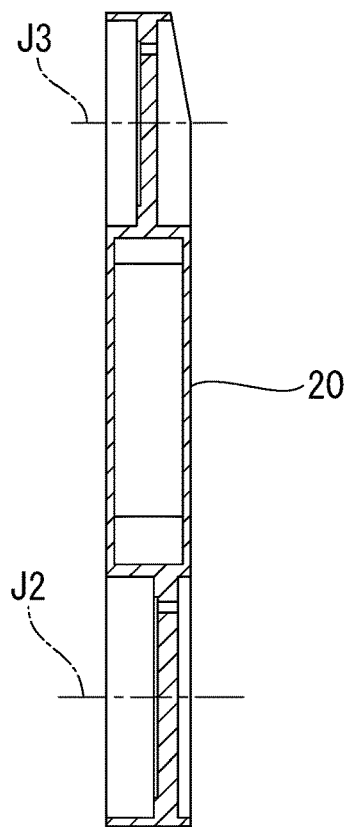
Figure 12:
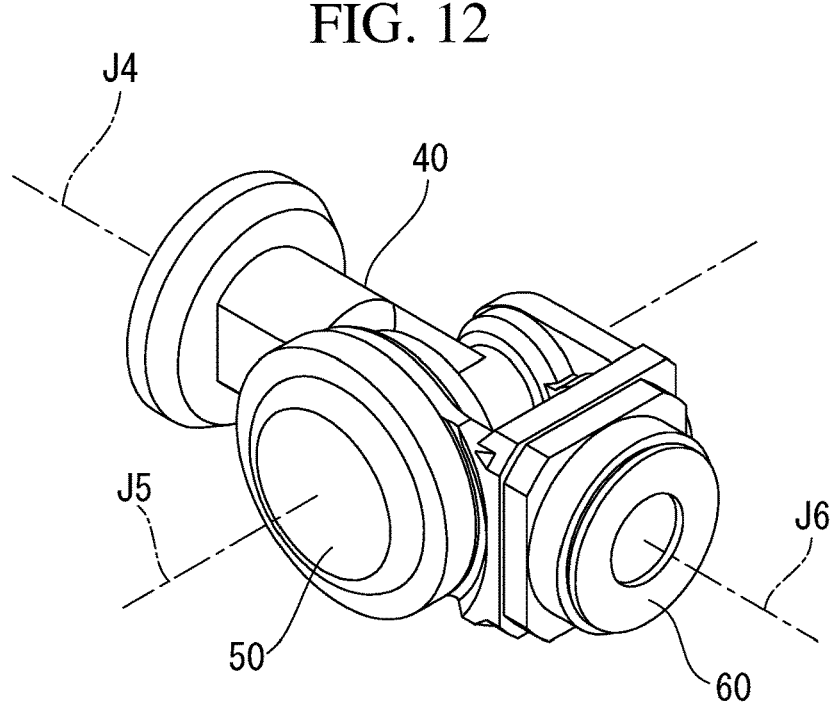
Figure 13:
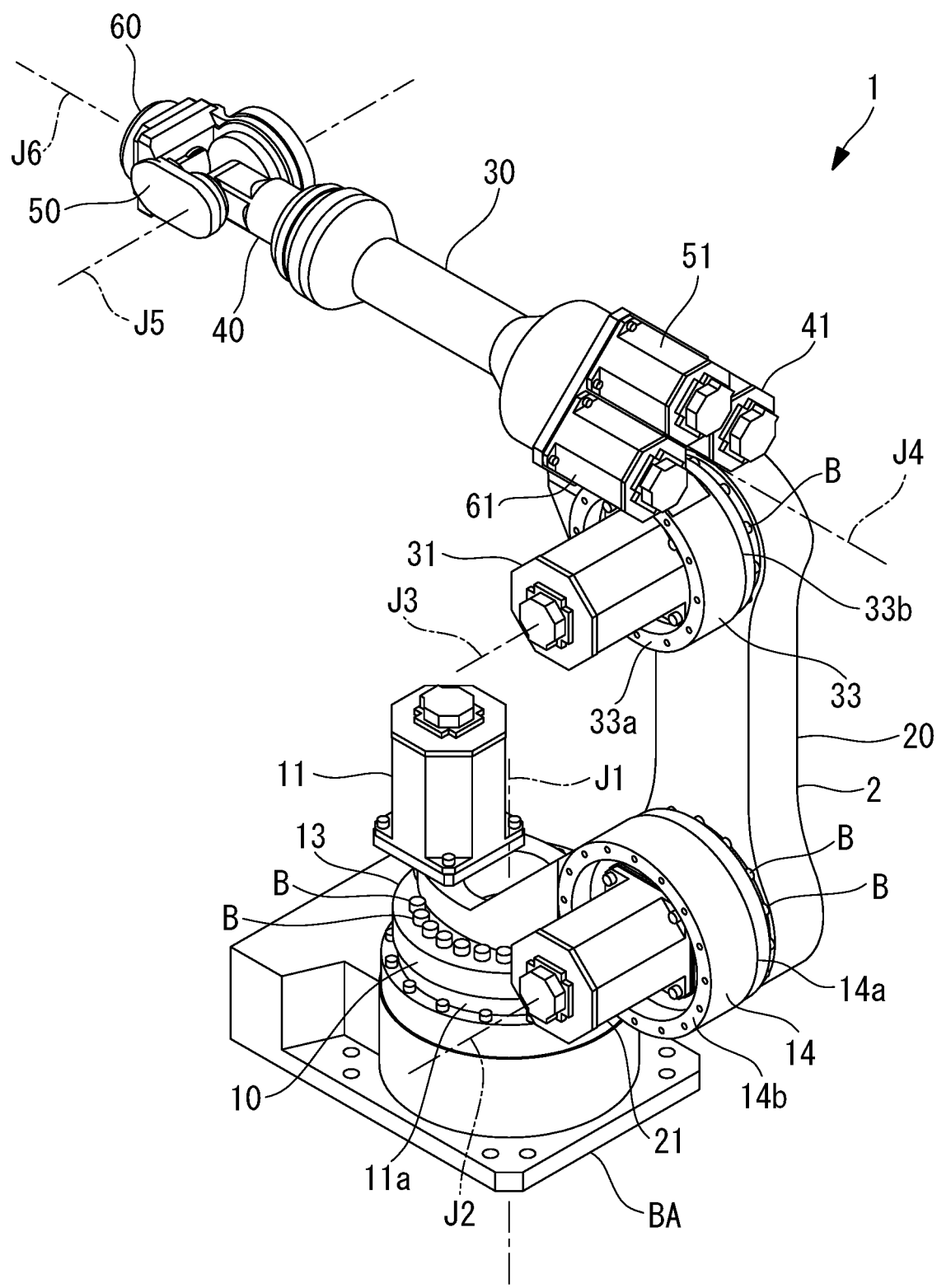
Figure 14:
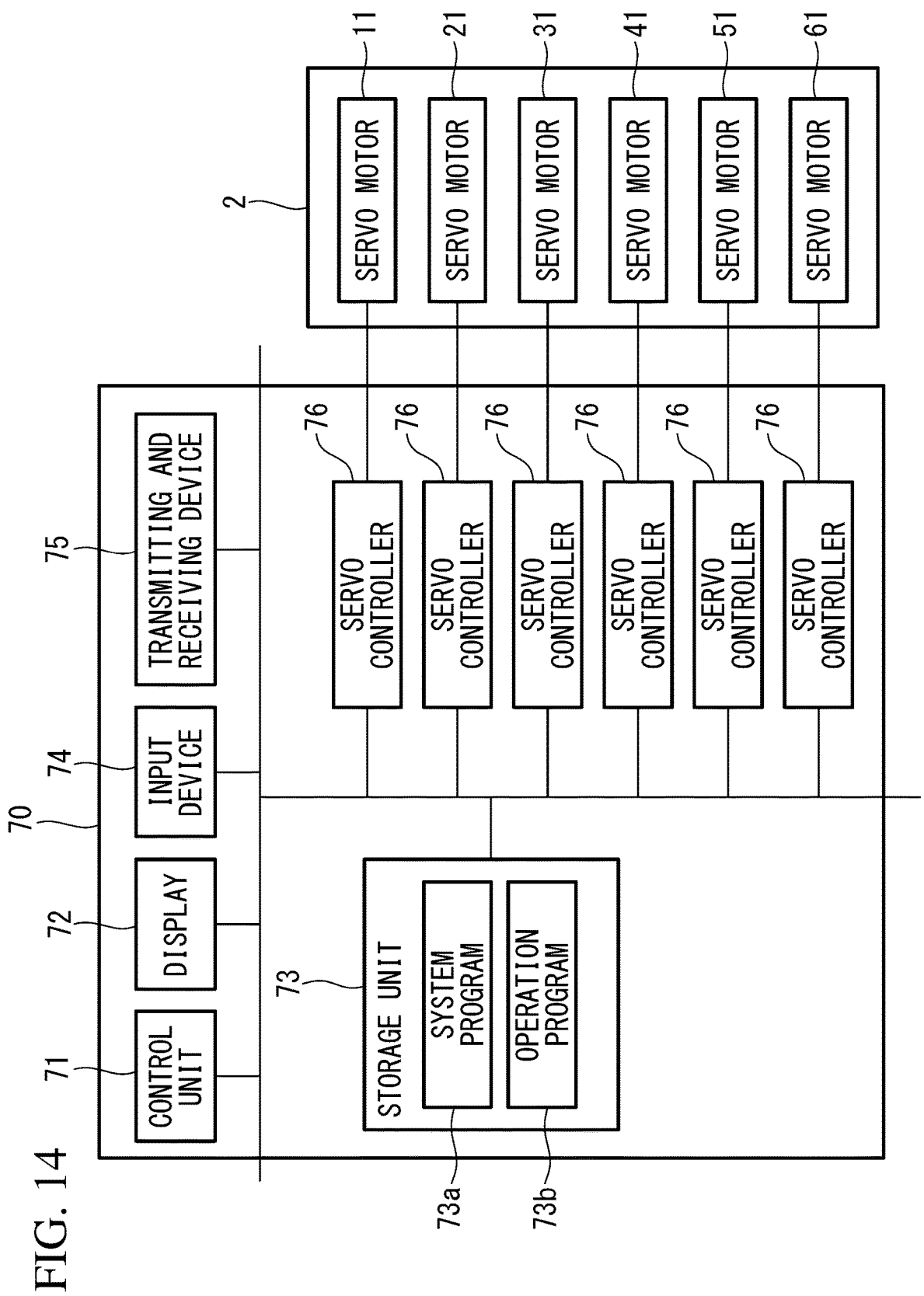

FIG. 1 is a perspective view of a robot according to an embodiment of the present invention.
FIG. 2 is an exploded perspective view of the robot of the embodiment.
FIG. 3 is a perspective view of a first arm member of the robot of the embodiment.
FIG. 4 is a plan view of the first arm member of the robot of the embodiment.
FIG. 5 is a cross sectional view of the first arm member of the robot of the embodiment, cut with the V-V line in FIG. 4.
FIG. 6 is a perspective view of a third arm member of the robot of the embodiment.
FIG. 7 is a plan view of the third arm member of the robot of the embodiment.
FIG. 8 is a cross sectional view of the third arm member of the robot according to the embodiment, cut with the VIII-VIII line in FIG. 7.
FIG. 9 is an exploded perspective view of the robot of the embodiment.
FIG. 10 is a front view of a second arm member of the robot of the embodiment.
FIG. 11 is a cross sectional view of the second arm member of the robot according to the embodiment, cut with the XI-XI line in FIG. 10.
FIG. 12 is a perspective view of a fourth arm member to a sixth arm member of the robot of the embodiment.
FIG. 13 is a perspective view of the robot of the embodiment.
FIG. 14 is a block diagram of a controller of the robot of the embodiment.

A robot 1 according to a first embodiment of the present invention will be described below with reference to the accompanying drawings.

As shown in FIG. 1, the robot 1 according to this embodiment includes an arm 2, and a voluntary tool is attached to a distal end portion of the arm 2.

As shown in FIG. 1, FIG. 2, and the like, the arm 2 includes a first arm member 10 which is supported by a base member BA, which is fixed to a predetermined installation surface, so as to be rotatable about a first axis line J1 which extends in an up-and-down direction, a second arm member 20 whose proximal end side is supported by the first arm member 10 so as to be swingable about a second axis line J2 which extends in a horizontal direction, and a third arm member 30 whose proximal end side is supported by a distal end side of the second arm member 20 so as to be swingable about a third axis line J3 which extends in the horizontal direction.

Also, the arm 2 includes a fourth arm member 40 which is supported by the third arm member 30 so as to be rotatable about a fourth axis line J4 which extends in a longitudinal direction of the third arm member 30, a fifth arm member 50 which is supported by the fourth arm member 40 so as to be swingable about a fifth axis line J5 which extends in a direction orthogonal to the fourth axis line J4, and a sixth arm member 60 which is supported by the fifth arm member 50 so as to be rotatable about a sixth axis line J6. There is a case where the fourth to the sixth arm members 40, 50, 60 are referred to as a wrist portion, and the sixth arm member 60 may be referred to as a wrist flange.

Moreover, the arm 2 includes a plurality of servo motors 11, 21, 31, 41, 51, 61 for respectively driving the first to the sixth arm members 10, 20, 30, 40, 50, 60 (refer to FIG. 14). Various kinds of motors, such as a rotary motor, a linear motor, and the like may be used as the servo motors 11, 21, 31, 41, 51, 61. The first to the sixth arm members 10, 20, 30, 40, 50, 60 are driven respectively by the servo motors 11, 21, 31, 41, 51, 61. Each of the servo motors 11, 21, 31, 41, 51, 61 has an operation position detection device in order to detect an operation position and operation speed of each of the servo motors 11, 21, 31, 41, 51, 61, and one example of the operation position detection device is an encoder. Detected values of the operation position detection devices are sent to a controller 70.

In this embodiment, a distal end side of the second arm member 20, the third arm member 30, and the fifth arm member 50 moves on a predetermined path around the proximal end side or a central portion thereof. In this embodiment, the above described movement is referred to as a swing. On the other hand, a central axis which extends from the proximal end side to the distal end side of each of the first arm member 10, the fourth arm member 40, and the sixth arm member 60 extends along the first axis line J1, the fourth axis line J4, or the sixth axis line J6. In other words, the first axis line J1, the fourth axis line J4, and the sixth axis line J6 respectively extend from the proximal end side of the first arm member 10, the fourth arm member 40, and the sixth arm member 60 to the distal end side thereof. In this embodiment, the above described movement of the first arm member 10, the fourth arm member 40, and the sixth arm member 60 about the first axis line J1, the fourth axis line J4, and the sixth axis line J6 is referred to as rotation.

The arm 2 is controlled by the controller 70. As shown in FIG. 14, the controller 70 includes a control unit 71 having a processor and the like, a display 72, a storage unit 73 having a non-volatile storage, a ROM, a RAM, and the like, an input device 74 which is a keyboard, a touch panel, an operation panel, and the like, a transmitting and receiving device 75 for transmitting and receiving signals, and a plurality of servo controllers 76 which are respectively connected to the servo motors 11, 21, 31, 41, 51, 61. The input device 74 and the transmitting and receiving device 75 function as an input unit.

A system program 73a is stored in the storage unit 73, and the system program 73a provides a basic function of the controller 70. Also, an operation program 73b is stored in the storage unit 73. On the basis of the operation program 73b, the control unit 71 sends a series of control signals for driving the servo motors 11, 21, 31, 41, 51, 61. Due to this, the arm 2 of the robot 1 performs operation on the basis of the operation program 73b.

Next, a configuration of the arm 2 will be explained.

As shown in FIGS. 1 and 2, the first arm member 10 is attached to a reducer 11a for the first arm member 10 by means of a plurality of bolts B. As shown in FIGS. 3 to 5, the first arm member 10 includes a first portion 13 which is arranged coaxially with the first axis line J1, and which has a circular-plate shape or a ring shape, and a second portion 14 which is arranged coaxially with the second axis line J2, and which has the circular-plate shape or the ring shape. Moreover, the first portion 13 and the second portion 14 may have any other shape. The first portion 13 and the second portion 14 are fixed to each other through a middle portion 15. The middle portion 15 is configured by a plate, a rib, and the like. The first portion 13 is attached to the reducer 11a by means of the plurality of bolts B.

The second portion 14 is provided with a first attaching surface 14a which is a surface substantially perpendicular to the second axis line J2, and to which the proximal end side of the second arm member 20 can be attached as shown in FIGS. 1 and 2, and a second attaching surface 14b which faces in a direction opposite from the first attaching surface 14a, and to which the proximal end side of the second arm member 20 can be attached. In this embodiment, the first attaching surface 14a and the second attaching surface 14b have a ring shape, however, they may have any other shape.

More specifically, a reducer 21a which is provided at the proximal end side of the second arm member 20 is attached to the first attaching surface 14a or the second attaching surface 14b by means of the plurality of bolts B. The reducer 21a is attached to the proximal end side of the second arm member 20 by means of the plurality of bolts B. Also, the proximal end side of the second arm member 20 can be attached to the first attaching surface 14a or the second attaching surface 14b by means of any other member.

The second portion 14 is provided with a first motor attaching surface 14c which is a surface substantially perpendicular to the second axis line J2, and to which the servo motor 21 can be attached, and a second motor attaching surface 14d which faces in a direction opposite from the first motor attaching surface 14c, and to which the servo motor 21 can be attached.

As shown in FIG. 2, the distal end side of the second arm member 20 is attached to the third arm member 30 by means of the plurality of bolts B. As shown in FIGS. 6 to 8, the proximal end side of the third arm member 30 is provided with an attaching portion 33 which is arranged coaxially with the third axis line J3, and which has the circular-plate shape or the ring shape. Also, the attaching portion 33 may have any other shape. The attaching portion 33 is provided with a third attaching surface 33a which is a surface substantially perpendicular to the third axis line J3, and to which the distal end side of the second arm member 20 can be attached, and a fourth attaching surface 33b which faces in a direction opposite from the third attaching surface 33a, and to which the second arm member 20 can be attached. According to this embodiment, the third attaching surface 33a and the fourth attaching surface 33b have a ring shape, however, they may have any other shape.

More specifically, a reducer 31a which is provided at the distal end side of the second arm member 20 is attached to the third attaching surface 33a or the fourth attaching surface 33b by means of the plurality of bolts B. The reducer 31a is attached to the distal end side of the second arm member 20 by means of the plurality of bolts B. Also, the distal end side of the second arm member 20 can be attached to the third attaching surface 33a or the fourth attaching surface 33b by means of any other member.

The attaching portion 33 is provided with a third motor attaching surface 33c which is a surface substantially perpendicular with respect to the third axis line J3, and to which the servo motor 31 can be attached, and a fourth motor attaching surface 33d which faces in a direction opposite from the third motor attaching surface 33c, and to which the servo motor 31 can be attached.

Also, as shown in FIG. 10, the second arm member 20 has a symmetrical shape with respect to a surface S1 which includes the second axis line J2 and the third axis line J3.

Moreover, as shown in FIGS. 4 and 5, the first arm member 10 has a symmetrical shape with respect to a surface S2 which is parallel to the first attaching surface 14a and the second attaching surface 14b. The distance from the surface S2 to the first attaching surface 14a is the same with the distance from the surface S2 to the attaching surface 14b. In this embodiment, the first axis line J1 is included in the surface S2.

Also, as shown in FIGS. 7 and 8, the third arm member 30 has a symmetrical shape with respect to a surface S3 which is parallel to the third attaching surface 33a and the fourth attaching surface 33b. The distance from the surface S3 to the third attaching surface 33a is the same with the distance from the surface S3 to the fourth attaching surface 33b. In this embodiment, the fourth axis line J4 is included in the surface S3.

In addition, as shown in FIG. 12, the fourth arm member 40 and the fifth arm member 50 have a symmetrical shape with respect to a surface which includes the fourth axis line J4 and the fifth axis line J5.

Since the arm 2 is configured as described above, it is possible to attach the proximal end side of the second arm member 20 to the first attaching surface 14a of the first arm member 10 as shown in FIG. 2, and it is also possible to attach the proximal end side of the second arm member 20 to the second attaching surface 14b of the first arm member 10 in such a state where the second arm member 20 is reversed as show in FIG. 9. Also, in FIG. 2, when the second arm member 20 is attached to the first attaching surface 14a, the distal end side of the second arm member 20 is attached to the third attaching surface 33a of the third arm member 30. Moreover, in FIG. 9, when the second arm member 20 is attached to the second attaching surface 14b, the distal end side of the second arm member 20 is attached to the fourth attaching surface 33b of the third arm member 30.

Since the second arm member 20 has a symmetrical shape with respect to the surface S1 which includes the second axis line J2 and the third axis line J3, an existence area of the second arm member 20 in a direction which is perpendicular to the surface S1 does not change even though an attached position of the proximal end side of the second arm member 20 is changed from the first attaching surface 14a to the second attaching surface 14b.

Also, the first arm member 10 has the symmetrical shape with respect to the surface S2 which is parallel to the first attaching surface 14a and the second attaching surface 14b, and the third arm member 30 has the symmetrical shape with respect to the surface S3 which is parallel to the third attaching surface 33a and the fourth attaching surface 33b. Accordingly, an existence are of the third arm member 30 in a direction which is perpendicular to the surface S2 does not change, and the existence area of the third arm member 30 around the third axis line J3 does not change as well even though the attached position of the proximal end side of the second arm member 20 is changed from the first attaching surface 14a to the second attaching surface 14b, and the attached position of the distal end side of the second arm member 20 is changed from the third attaching surface 33a to the fourth attaching surface 33b.

Moreover, since the arm 2 is configured as described above, in such a state where the proximal end side of the second arm member 20 is attached to the first attaching surface 14a of the first arm member 10, it is possible to attach the third attaching surface 33a of the third arm member 30 to the distal end side of the second arm member 20 as shown in FIGS. 1 and 2, and it is also possible to attach the fourth attaching surface 33b of the third arm member 30 to the distal end side of the second arm member 20 as shown in FIG. 13. The attached state of FIG. 13 allows the arm 2 to move more easily toward the upper side and the rear side of the robot 1 than the attached state of FIG. 1.

Moreover, as shown in FIG. 9, in such a state where the proximal end side of the second arm member 20 is attached to the second attaching surface 14b of the first arm member 10, when the distal end side of the second arm member 20 is attached to the third attaching surface 33a of the third arm member 30, the arm 2 is in an attached state where the arm 2 can move easily toward the upper side and the rear side of the robot 1, which is the same with the attaching state of FIG. 13.

In this embodiment, the configuration of the arm 2 of the robot 1 differs between a case where the second arm member 20 is attached to the first attaching surface 14a and a case where the second arm member 20 is attached to the second attaching surface 14b. That is to say, the arm configuration of the robot 1 can be changed by changing the position of the second arm member 20. This configuration is advantageous for constructing an effective manufacturing line, and is also advantageous for facilitating management of the robot 1.

In order to construct an effective manufacturing line, it is preferable that a plurality of kinds of robots having various kinds of arm configurations are used. On the other hand, the manufacturing line is changed, newly constructed, and the like in response to a manufacturing object, however, when too many kinds of the robots are owned, it is more likely that there is a type of the robot which is not used in the next manufacturing line. Also, it is complicated to manage the robots when there are too many kinds of the robots. On the contrary, in this embodiment, since it is possible to change the arm configuration of the robot 1, the above described circumstances can be improved.

Moreover, in this embodiment, the third arm member 30 is provided with a third attaching surface 33a which is a surface substantially perpendicular with respect to the third axis line J3, and to which the distal end side of the second arm member 20 can be attached, and a fourth attaching surface 33b which faces in a direction opposite from the third attaching surface 33a, and to which the distal end side of the second arm member 20 can be attached.

With this configuration, the arm configuration of the robot 1 differs between a case where the distal end side of the second arm member 20 is attached to the third attaching surface 33a and a case where the distal end side of the second arm member 20 is attached to the fourth attaching surface 33b. That is to say, the arm configuration of the robot 1 can be changed by changing the position of the second arm member 20 with respect to the third arm member 30.

Also, in this embodiment, the first arm member 10 has the symmetrical shape with respect to the surface S2 which is parallel to the first attaching surface 14a and the second attaching surface 14b.

With this configuration, by changing the attached position of the second arm member 20 from the first attaching surface 14a to the second attaching surface 14b, the position of the second arm member 20 is moved to a position which is symmetrical with respect to the surface S2. And therefore, an operator can easily understand the change of the configuration of the arm 2 when the attached position of the second arm member 20 is changed from the first attaching surface 14a to the second attaching surface 14b. This is advantageous for facilitating teaching operation of the robot 1, setting of the operation program, and the like after the attached position of the second arm member 20 is changed.

In addition, in this embodiment, the third arm member 30 has the symmetrical shape with respect to the surface S3 which is parallel to the third attaching surface 33a and the fourth attaching surface 33b.

With this configuration, by changing the attaching position of the distal end side of the second arm member 20 from the third attaching surface 33a to the fourth attaching surface 33b, the position of the second arm member 20 is moved to a position which is symmetrical with respect to the surface S3. Therefore, the operator can easily understand the change of the configuration of the arm 2 when the attached position of the second arm member 20 is changed from the third attaching surface 33a to the fourth attaching surface 33b. This is advantageous for facilitating the teaching operation of the robot 1, the setting of the operation program, and the like after the attached position of the second arm member 20 is changed.

And, in this embodiment, the first arm member 10 has the symmetrical shape with respect to the surface S2, and the third arm member 30 has the symmetrical shape with respect to the surface S3. In this case, for example, when the attaching position of the second arm member 20 is changed from the first attaching surface 14a and the third attaching surface 33a to the second attaching surface 14b and the fourth attaching surface 33b, and in a state where there is no change in the position of the third arm member 30 in a direction along the third axis line J3 with respect to the first arm member 10, the position of the second arm member 20 is moved to a position which is symmetrical with respect to the surfaces S2 and S3. In other words, the first to the third arm members 10, 20, 30 of the arm 2 before the change and those after the change have a mirror shape with respect to each other. This is extremely advantageous for facilitating the teaching operation of the robot 1, the setting of the operation program, and the like after the attached position of the second arm member 20 is changed.

Moreover, in this embodiment, the second arm member 20 has the symmetrical shape with respect to the surface S1 which includes the second axis line J2 and the third axis line J3.

With this configuration, the existence area of the second arm member 20 in the direction which is perpendicular to the surface S1 does not change even though the attached position of the second arm member 20 is changed from the first attaching surface 14a to the second attaching surface 14b. This is advantageous for facilitating the teaching operation of the robot 1, the setting of the operation program, and the like after the attached position of the second arm member 20 is changed.

It takes much time to perform the teaching operation after installing an articulated robot, such as the robot 1, and the like, in the manufacturing line. For example, the teaching operation is performed so that the robot 1 uses a tool, which is provided at the distal end portion of the robot 1, in order to perform operation such as welding, other processing, picking, and the like with respect to an object which is transferred by the transfer device. At this time, at each of a series of teaching positions for performing the operation, at least a positional relationship between a tool and the object, setting of a position, posture, and the like of the arm 2 for accurately performing the operation on the object by the tool, whether or not the arm 2 of the robot 1 interferes with surrounding devices, and the like are confirmed, and other than that, quality of the operation is optimized as well.

The above described teaching is performed by creating and adjusting an operation program for moving the arm 2. In order to perform the teaching operation on the manufacturing line in a short period of time, there is a case where the operation program may be created by using a simulation device. However, since there is influence of slight differences between the robot 1 on the simulation and the actually used robot 1, unevenness of the objects, the gravity, other external force, and the like, it is necessary to adjust the operation program which is created by using the simulation device so as to conform to the operation of the actually used robot 1.

As described above, the configuration of this embodiment is advantageous for facilitating the operation for creating and adjusting the operation program of the robot 1. For example, when a robot 1 which is located at the right side of the manufacturing line and a robot 1 which is located at the left side thereof to perform the same operation, an operation program of one of the robots 1 can be used as a base of an operation program of the other one of the robots 1. In such a case where one of the robots 1 and the other one of the robots 1 have a mirror configuration with each other, by mirror converting the operation program, the mirror converted operation program can be used as the operation program of the other one of the robots 1. Needless to say, a minor adjustment of the operation program of the other one of the robots 1 is necessary, however, this is extremely advantageous for facilitating the setting of the operation program.

Moreover, in this embodiment, the arm 2 includes a fourth arm member 40 which is supported by the third arm member 30 so as to be rotatable about the fourth axis line J4 which extends in a longitudinal direction of the third arm member 30, a fifth arm member 50 which is supported by the fourth arm member 40 so as to be swingable about the fifth axis line J5 which extends in a direction orthogonal to the fourth axis line J4, and a sixth arm member 60 which is supported by the fifth arm member 50 so as to be rotatable about the sixth axis line J6, and the forth arm member 40 and the fifth arm member 50 have a symmetrical shape with respect to a surface which includes the fourth axis line J4 and the fifth axis line J5.

With this configuration, for example, when the attached position of the second arm member 20 is changed from the first attaching surface 14a and the third attaching surface 33a to the second attaching surface 14b and the fourth attaching surface 33b, and further, when the wrist portion which is configured by the fourth, the fifth, and the sixth arm members 40, 50, 60 is rotated by 180 degrees about the fourth axis line J4 so as to be attached to the arm 2, the entire arm 2 before the change and that after the change have a mirror shape with respect to each other. This is extremely advantageous for facilitating the teaching operation of the robot 1, the setting of the operation program, and the like after the attached position of the second arm member 20 is changed.

The following aspects of the present invention are derived from the above disclosure.

A robot according to a first aspect of the present invention includes a first arm member rotatable about a first axis line which extends in an up-and-down direction with respect to a base member; a second arm member supported by the first arm member and so as to be swingable about a second axis line which extends in a horizontal direction; and a third arm member which is supported by a distal end side of the second arm member so as to be swingable about a third axis line which extends in the horizontal direction, wherein the first arm member is provided with a first attaching surface which is a surface substantially perpendicular to the second axis line, and to which the second arm member can be attached, and the first arm member is provided with a second attaching surface which faces in a direction opposite from the first attaching surface, and to which the second arm member can be attached.

With this configuration, an arm configuration of the robot differs between a case where the second arm member is attached to the first attaching surface and a case where the second arm member is attached to the second attaching surface. That is to say, it is possible to change the arm configuration of the robot by changing the position of the second arm member. This configuration is advantageous for constructing an effective manufacturing line, and in addition, it is also advantageous for facilitating management of the robot.

With the above aspect, preferably, the third arm member is provided with a third attaching surface which is a surface substantially perpendicular to the third axis line, and to which the distal end side of the second arm member can be attached, and the third arm member is provided with a fourth attaching surface which faces in a direction opposite from the third attaching surface, and to which the distal end side of the second arm member can be attached.

With this configuration, the arm configuration of the robot differs between a case where the distal end side of the second arm member is attached to the third attaching surface and a case where the distal end side of the second arm member is attached to the fourth attaching surface. That is to say, it is possible to change the arm configuration of the robot by changing the position of the second arm member with respect to the third arm member.

With the above aspect, preferably, the first arm member has a symmetrical shape with respect to a surface which is parallel to the first attaching surface and the second attaching surface.

With this configuration, when an attached position of the second arm member is changed from the first attaching surface to the second attaching surface, the position of the second arm member is moved to a position which is symmetrical with respect to the surface. Therefore, an operator can easily understand the change of the configuration of the arm when the attaching position of the second arm member is changed from the first attaching surface to the second attaching surface. This is advantageous for facilitating teaching operation of the robot, setting of an operation program, and the like after the attached position of the second arm member is changed.

With the above aspect, preferably, the third arm member has a symmetrical shape with respect to a surface which is parallel to the third attaching surface and the fourth attaching surface.

With this configuration, when the attached position of the distal end side of the second arm member is changed from the third attaching surface to the fourth attaching surface, the position of the second arm member is moved to a position which is symmetrical with respect to the surface. Therefore, it is easy for the operator to understand the change of the configuration of the arm when the attaching position of the second arm member is changed from the third attaching surface to the fourth attaching surface. This is advantageous for facilitating the teaching operation of the robot, the setting of the operation program, and the like after the attached position of the second arm member is changed.

More preferably, the first arm member has the symmetrical shape with respect to a surface which is parallel to the first attaching surface and the second attaching surface, and the third arm member has the symmetrical shape with respect to a surface which is parallel to the third attaching surface and the fourth attaching surface. In this case, for example, when the attached position of the second arm member is changed from the first attaching surface and the third attaching surface to the second attaching surface and the fourth attaching surface, in a state where there is no change in the position of the third arm member with respect to the first arm member, the position of the second arm member is moved to a position which is symmetrical with respect to the surface. That is to say, the first to the third arm members of the arm before the change and those after the change have a mirror shape with respect to each other. This is extremely advantageous for facilitating the teaching operation of the robot, the setting of the operation program, and the like after the attaching position of the second arm member is changed.

With the above aspect, preferably, the second arm member has a symmetrical shape with respect to a surface which includes the second axis line and the third axis line.

In this configuration, an existence area of the second arm member in a direction which is perpendicular to the surface does not change even though the attached position of the second arm member is changed from the first attaching surface to the second attaching surface. This is advantageous for facilitating the teaching operation of the robot, the setting of the operation program, and the like after the attached position of the second arm member is changed.

With the above aspect, preferably, the robot includes a fourth arm member which is supported by the third arm member so as to be rotatable about a fourth axis line which extends in a longitudinal direction of the third arm member; a fifth arm member which is supported by the fourth arm member so as to be swingable about a fifth axis line which extends in a direction orthogonal to the fourth axis line; and a sixth arm member which is supported by the fifth arm member so as to be rotatable about a sixth axis line, wherein, the fourth arm member and the fifth arm member have a symmetrical shape with respect to a surface which includes the fourth axis line and the fifth axis line.

With this configuration, for example, when the attached position of the second arm member is changed from the first attaching surface and the third attaching surface to the second attaching surface and the fourth attaching surface, and further, when a wrist portion which is configured by the fourth to the sixth arm members is rotated by 180 degrees about the fourth axis line so as to be attached to the arm, the entire arm before the change and that after the change have a mirror shape with respect to each other. This is extremely advantageous for facilitating the teaching operation of the robot, the setting of an operation program, and the like after the attached position of the second arm member is changed.

A second aspect of the present invention is a first arm member used in a robot which includes: a first arm member which is rotatable about a first axis line which extends in an up-and-down direction with respect to a base; a second arm member which is supported by the first arm member so as to be swingable about the second axis line which extends in a horizontal direction; and a third arm member which is supported by the second arm member so as to be swingable about a third axis line which extends in the horizontal direction, the first arm member including: a first portion fixed to a reducer for the first arm member; and a second portion fixed to the first portion, wherein the second portion is provided with a first attaching surface which is a surface substantially perpendicular to the second axis line, and to which the second arm member can be attached, and the second portion is provided with a second attaching surface which faces in a direction opposite from the first attaching surface, and to which the second arm member can be attached.

According to the above aspects, it is possible to construct an effective manufacturing line, and in addition, it is possible to reduce a load on management.

REFERENCE SIGNS LIST 1 robot
2 arm
10 first arm member
13 first portion
14 second portion
14a first attaching surface
14b second attaching surface
20 second arm member
30 third arm member
33 attaching portion
33a third attaching surface
33b fourth attaching surface
40 fourth arm member
50 fifth arm member
60 sixth arm member
11 to 61 servo motors
70 controller
BA base member
S1 to S3 surface

The invention claimed is:

1. A robot comprising:
a first arm member rotatable about a first axis line which extends in an up-and-down direction with respect to a base member;
a second arm member supported by the first arm member and so as to be swingable about a second axis line which extends in a horizontal direction;
a third arm member which is supported by a distal end side of the second arm member so as to be swingable about a third axis line which extends in the horizontal direction;
a motor configured to swing the second arm member about the second axis line;
a reducer provided between the motor and the second arm member;
wherein the first arm member has a first attaching surface formed therein and being substantially perpendicular to the second axis line and a second attaching surface formed therein which faces in a direction opposite from the first attaching surface;
wherein the second arm member is selectively attachable to both the first attaching surface and the second attaching surface, wherein the second arm member is selectively attachable to only one of the first attaching surface and the second attaching surface at a given time, and
wherein the reducer is located between the first arm member and the second arm member.

2. The robot according to claim 1, wherein:
the third arm member is provided with:
a third attaching surface substantially perpendicular to the third axis line; and
a fourth attaching surface which faces in a direction opposite from the third attaching surface; and
wherein the second arm member is selectively attachable to either of the third attaching surface or the fourth attaching surface.

3. The robot according to claim 2, wherein the third arm member has a symmetrical shape with respect to a surface which is parallel to the third attaching surface and the fourth attaching surface.

4. The robot according to claim 2, wherein the first arm member has a symmetrical shape with respect to a surface which is parallel to the first attaching surface and the second attaching surface.

5. The robot according to claim 4 wherein the third arm member has a symmetrical shape with respect to a surface which is parallel to the third attaching surface and the fourth attaching surface.

6. The robot according to claim 5, wherein the second arm member has a symmetrical shape with respect to a surface which includes the second axis line and the third axis line.

7. The robot according to claim 1, wherein, the first arm member has a symmetrical shape with respect to a surface which is parallel to the first attaching surface and the second attaching surface.

8. The robot according to claim 1, wherein the second arm member has a symmetrical shape with respect to a surface which includes the second axis line and the third axis line.

9. The robot according to claim 1 comprising:
a fourth arm member which is supported by the third arm member so as to be rotatable about a fourth axis line which extends in a longitudinal direction of the third arm member;
a fifth arm member which is supported by the fourth arm member so as to be swingable about a fifth axis line which extends in a direction orthogonal to the fourth axis line;
a sixth arm member which is supported by the fifth arm member so as to be rotatable about a sixth axis line; and
wherein the fourth arm member and the fifth arm member have a symmetrical shape with respect to a surface which includes the fourth axis line and the fifth axis line.

10. A first arm member used in a robot, wherein the robot includes the first arm member rotatable about a first axis line which extends in an up-and-down direction with respect to a base;
a second arm member which is supported by the first arm member so as to be swingable about the second axis line which extends in a horizontal direction;
a motor configured to swing the second arm member about the second axis line;
a first reducer provided between the motor and the second arm member; and
a third arm member which is supported by the second arm member so as to be swingable about a third axis line which extends in the horizontal direction, the first arm member comprising:
a first portion fixed to a second reducer for the first arm member;
a second portion fixed to the first portion;
wherein the second portion is provided with a first attaching surface substantially perpendicular to the second axis line and a second attaching surface which faces in a direction opposite from the first attaching surface, wherein the first attaching surface and the second attaching surface are both part of the first arm member;
wherein the second arm member is selectively attachable to both the first attaching surface and the second attaching surface, wherein the second arm member is selectively attachable to only one of the first attaching surface and the second attaching surface at a given time; and wherein the first reducer is located between the first arm member and the second arm member.

* * * * *